US008935626B2

(12) United States Patent
Chang (10) Patent No.: US 8,935,626 B2
(45) Date of Patent: Jan. 13, 2015

(54) HANDHELD ELECTRONIC DEVICE AND METHOD FOR SWITCHING USER INTERFACE THEREOF

(75) Inventor: Yu-Hsien Chang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 1215 days.

(21) Appl. No.: 12/168,070

(22) Filed: Jul. 4, 2008

(65) Prior Publication Data

US 2009/0172530 A1    Jul. 2, 2009

(30) Foreign Application Priority Data

Dec. 26, 2007   (TW) ............................... 96150323 A (51) Int. Cl.
*G06F 3/048* (2013.01)
*H04M 1/02* (2006.01)
*G06F 1/16* (2006.01)
*G06F 3/0488* (2013.01)

(52) U.S. Cl.
CPC ........... *H04M 1/0239* (2013.01); *G06F 1/1624* (2013.01); *G06F 1/1677* (2013.01); *G06F 3/04886* (2013.01); *H04M 1/0241* (2013.01)
USPC .......................................... 715/773; 345/168

(58) Field of Classification Search
USPC .......................................... 715/773; 345/168
See application file for complete search history.

(56) References Cited

U.S. PATENT DOCUMENTS

| | | | | |
|---|---|---|---|---|
| 4,149,264 A | * | 4/1979 | Hamada et al. ................. | 345/11 |
| 4,415,985 A | * | 11/1983 | McDaniel et al. ............ | 345/551 |
| 4,460,974 A | * | 7/1984 | Jones ........................... | 345/168 |
| 4,757,443 A | * | 7/1988 | Hecker et al. ................. | 345/10 |
| 5,265,201 A | * | 11/1993 | Cabot et al. .................... | 345/504 |
| 5,319,582 A | * | 6/1994 | Ma ................................ | 345/169 |
| 5,329,291 A | * | 7/1994 | Chen ............................. | 345/157 |
| 5,331,335 A | * | 7/1994 | Iida .............................. | 345/684 |
| 5,347,627 A | * | 9/1994 | Hoffmann et al. ............. | 715/762 |
| 5,764,226 A | * | 6/1998 | Consolatti et al. ............. | 715/747 |

(Continued)

FOREIGN PATENT DOCUMENTS

| | | |
|---|---|---|
| CN | 2704978 | 6/2005 |
| TW | I278216 | 4/2007 |
| WO | 2007/137428 | 12/2007 |

OTHER PUBLICATIONS

First Office Action of China Counterpart Application, issued on Sep. 9, 2010, p. 1-p. 6.

(Continued)

*Primary Examiner* — Steven Sax
*Assistant Examiner* — David Choi
(74) *Attorney, Agent, or Firm* — Jianq Chyun IP Office (57) ABSTRACT

A handheld electronic device and a method for switching a user interface thereof are provided. The present method is suitable for a handheld electronic device having a first part and a second part. The first part comprises a screen, and the second part is slidingly disposed below the first part along a specific path. A part type of the second part is detected when the second part is slid out along the specific path relative to the first part. Then, the user interface is switched and displayed on the screen according to the part type, wherein the displayed user interface is corresponding to application programs relative to the part type. As a result, convenience of executing application programs on the handheld electronic device can be improved.

17 Claims, 8 Drawing Sheets

(56) References Cited

U.S. PATENT DOCUMENTS

| | | | |
|---|---|---|---|
| 5,926,170 A * | 7/1999 | Oba | 345/168 |
| 6,832,354 B2 * | 12/2004 | Kawano et al. | 715/771 |
| 6,850,226 B2 * | 2/2005 | Finke-Anlauff | 345/169 |
| 7,100,031 B1 * | 8/2006 | Reasor et al. | 713/1 |
| 7,610,345 B2 * | 10/2009 | Collins et al. | 709/206 |
| 2007/0065220 A1 * | 3/2007 | Kemppinen | 400/682 |
| 2007/0115255 A1 * | 5/2007 | Pan | 345/156 |
| 2008/0119211 A1 * | 5/2008 | Paas et al. | 455/466 |
| 2008/0154576 A1 * | 6/2008 | Wu et al. | 704/2 |
| 2008/0167097 A1 * | 7/2008 | Ko | 455/575.4 |
| 2008/0242343 A1 * | 10/2008 | Koh et al. | 455/550.1 |
| 2008/0244447 A1 * | 10/2008 | Sagar | 715/810 |
| 2009/0009949 A1 * | 1/2009 | Lai et al. | 361/681 |
| 2009/0104950 A1 * | 4/2009 | Huang | 455/575.4 |
| 2009/0172530 A1 * | 7/2009 | Chang | 715/700 |
| 2009/0186663 A1 * | 7/2009 | Griffin et al. | 455/566 |

OTHER PUBLICATIONS

"Office Action of Taiwan Counterpart Application", issued on Jan. 31, 2012, p. 1-p. 7.

* cited by examiner

HANDHELD ELECTRONIC DEVICE AND METHOD FOR SWITCHING USER INTERFACE THEREOF

CROSS-REFERENCE TO RELATED APPLICATION

This application claims the priority benefit of Taiwan application serial no. 96150323, filed on Dec. 26, 2007. The entirety of the above-mentioned patent application is hereby incorporated by reference herein and made a part of this specification.

BACKGROUND OF THE INVENTION

1. Field of the Invention

The present invention relates to a handheld electronic device. More particularly, the present invention relates to a handheld electronic device and a method for switching a user interface thereof.

2. Description of Related Art

To cope with a high demanding efficiencies and multifunctional devices required by modern human beings, more and more functions used to be only implemented in a personal computer are now gradually integrated into a cell phone. The cell phone of a new generation not only has a function of making phone calls, but also has functions such as playing multimedia file, surfing internet, tranceiving email, managing personal data and schedule, or processing simple document etc. However, as the functions are increasingly powerful, required key types and key number are increased accordingly. Now, considering both screen space and keyboard space, sliding design of the cell phone has gradually become a general trend recently.

Figure 1A:
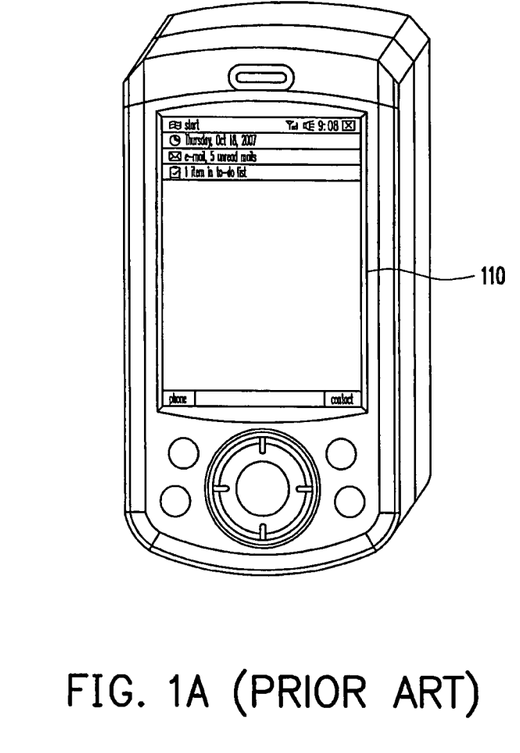
FIG. 1A is a schematic diagram illustrating an appearance of a conventional slide cell phone.
Figure 1B:
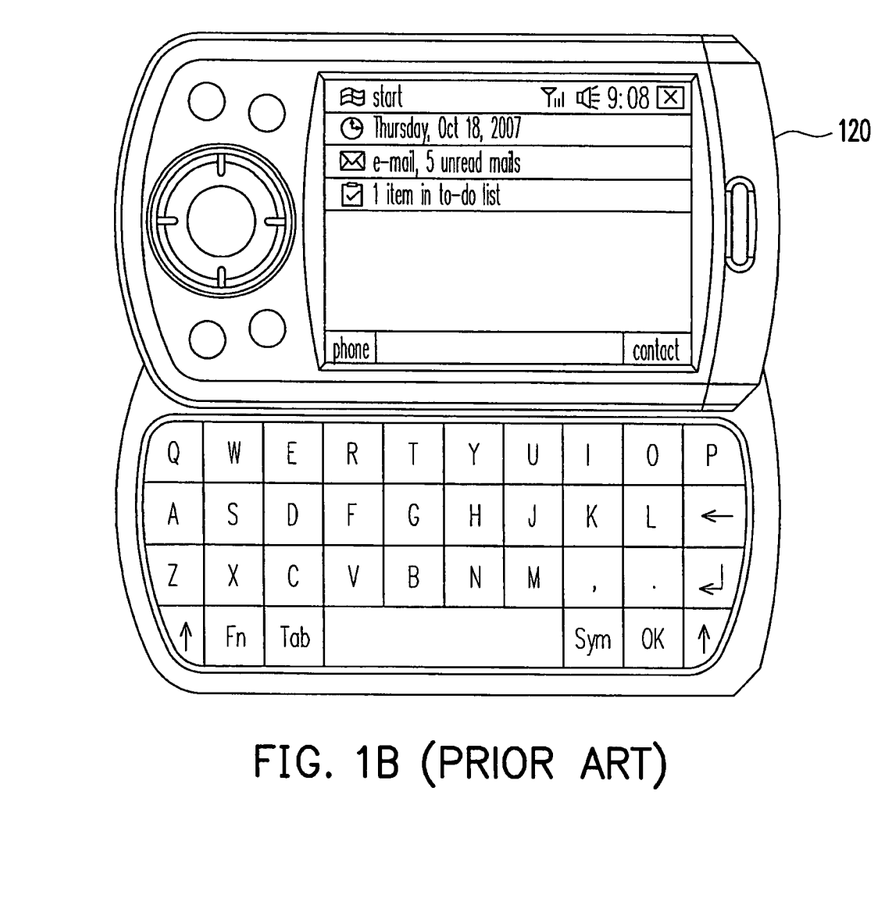
FIG. 1B is a schematic diagram illustrating an appearance of a conventional slide cell phone when a cover thereof is slid out.

FIG. 1A is a schematic diagram illustrating an appearance of a conventional slide cell phone. Before a cover of the cell phone is slid out, a keyboard thereof is hidden behind a body of the cell phone. As shown in FIG. 1B, when the cover is slid away, the keyboard is then slid out from a side of the cell phone for inputting commands. According to a deploying direction of keyboard keys, when the keyboard is slid out from the side of the cell phone, the cell phone is generally rotated for 90 degrees for operation. For operation convenience of the cell phone, direction and content of displayed images are generally varied according to a present state of the cell phone during operation of internal software of the cell phone. Referring to FIGS. 1A and 1B, by comparing images displayed on a screen 110 and a screen 120, it is discovered that when the keyboard is slid out and the cell phone is rotated at 90 degrees, display direction of the image is then changed from a portrait mode shown as FIG. 1A to a landscape mode shown as FIG. 1B. Therefore, the user may refer to the image displayed in the landscape mode while operating the keyboard, by which a problem of inconsistency between the displayed image and the keyboard is avoided, such that a desired option displayed thereon may be conveniently selected.

However, regardless of the image being displayed in the portrait mode or the landscape mode, the user has to click and select repeatedly for obtaining a desired function menu, and then a desired application program to be executed is selected from the function menu. Therefore, such operation method is inconvenient for the user. For example, when a cell phone with a built-in windows operating system is used for sending an email, a keyboard thereof is first slid out for inputting characters, and then a position of email application program is gradually selected from a "start" menu of a standby mode of the cell phone, so as to execute the application program. Therefore, such method leads to a waste of a lot of time, and the user may tend to have a negative utilization sense of the cell phone.

SUMMARY OF THE INVENTION

Accordingly, the present invention is directed to a method for switching a user interface, which is suitable for a slide handheld electronic device. When a keyboard of the handheld electronic device is slid out, the user interface is switched according to a type of the slide out keyboard, and an application program corresponding to the type of the keyboard is displayed on the user interface, so as to improve an operation convenience thereof.

The present invention is directed to a handheld electronic device, which may display a representative icon or an operation image corresponding to an application program on a user interface according to a type of a slid out keyboard thereof. By directly clicking and selecting the icon displayed on the user interface, time required for activating the application program is reduced compared to that of a conventional method, in which the application program is activated via operation of a menu.

The present invention provides a method for switching a user interface. The method is suitable for a handheld electronic device having a first part and a second part. The first part includes a screen, and the second part is slidingly disposed below the first part along a specific path. According to the method, a part type of the second part is detected when the second part is slid out along the specific path relative to the first part. Then, the user interface is switched and displayed on the screen according to the part type, wherein the displayed user interface includes an application program corresponding and relative to the part type.

In an embodiment of the present invention, the specific path is a horizontal path or a vertical path.

In an embodiment of the present invention, the second part includes a keyboard, wherein the keyboard may be a QWERTY keyboard or may be a keyboard composed of letter keys, symbol keys, function keys, numeral keys or other different kind of keys.

In an embodiment of the present invention, the step of switching and displaying the user interface on the screen according to the part type includes displaying a corresponding user interface according to a key type of the keyboard. Wherein, if the key type of the keyboard includes at least one of the letter keys, the symbol key, the function key or the numeral key, the displayed user interface then includes a corresponding application program requiring the letter keys, the symbol key, the function key or the numeral key accordingly during operation thereof.

In an embodiment of the present invention, the method for switching the user interface further includes switching and displaying the user interface on the screen according to a predetermined input mode of the keyboard. Wherein, the displayed user interface includes an application program corresponding to the predetermined input mode, and the predetermined input mode may be a Chinese input mode, an English input mode, a numeral input mode or a symbol input mode.

In an embodiment of the present invention, the step of switching and displaying user interface on the screen includes displaying a representative icon of each application program on the user interface, or displaying an operation image of one of the application programs on the user interface.

In an embodiment of the present invention, the displayed operation image integrates with a pattern of the second part.

According to another aspect, the present invention provides a handheld electronic device including a first part, a second part, a slide-detecting module and a processing module. The first part includes a screen, and the second part is slidingly disposed below the first part along a specific path. The slide-detecting module is coupled to the first part and the second part for detecting a sliding action of the second part sliding out along the specific path relative to the first part. The processing module is coupled to the first part, the second part and the slide-detecting module for judging a part type of the second part, switching and displaying a user interface on the screen according to the part type when the slide-detecting module detects the sliding action of the second part. Wherein, the user interface switched and displayed on the screen includes an application program corresponding and relative to the part type.

In an embodiment of the present invention, the specific path comprises a horizontal path or a vertical path.

In an embodiment of the present invention, the second part includes a keyboard, wherein the keyboard may be a QWERTY keyboard or may be a keyboard composed of letter keys, symbol keys, function keys, numeral keys or other different kind of keys.

In an embodiment of the present invention, the processing module displays a corresponding user interface according to a key type of the keyboard. Wherein, if the key type of the keyboard includes at least one of the letter keys, the symbol key, the function key or the numeral key, the displayed user interface then includes a corresponding application program requiring the letter keys, the symbol key, the function key or the numeral key accordingly during operation thereof.

In an embodiment of the present invention, the processing module may also switch and display the user interface on the screen according to a predetermined input mode of the keyboard. Wherein, the displayed user interface includes an application program corresponding to the predetermined input mode, and the predetermined input mode may be a Chinese input mode, an English input mode, a numeral input mode or a symbol input mode.

In an embodiment of the present invention, the processing module displays a representative icon of each application program on the user interface, or displays an operation image of one of the application programs on the user interface.

In an embodiment of the present invention, the operation image displayed on the user interface integrates with a pattern of the second part.

In an embodiment of the present invention, the slid-detecting module may be a slide switch or a sensor.

In the present invention, when the keyboard is slid out from the handheld electronic device, the application program corresponding to the type of the keyboard is displayed on the user interface. As a result, after the keyboard is slid out, the application program requiring such type of the keyboard during operation thereof is then displayed on the user interface, such that a desired application program may be quickly selected, and finding a position of the desired application program from a complicated function menu is unnecessary. Accordingly, operation convenience of the handheld electronic device is improved.

In order to make the aforementioned and other objects, features and advantages of the present invention comprehensible, a preferred embodiment accompanied with figures is described in detail below.

DESCRIPTION OF EMBODIMENTS

When a user operates a slide handheld electronic device, once a keyboard therein is slid out, it represents an application program related to keyboard inputting is about to be executed. Therefore, if the application program to be executed may be forecasted according to an action of the user, and if representative icons or operation images of the application programs may be directly displayed on a user interface, operation convenience of the handheld electronic device is then greatly improved. Accordingly, the present invention provides a handheld electronic device and a method for switching a user interface thereof based on above concept. To fully convey the spirit of the present invention to those skilled in the art, embodiments of the present inventions are described in detail below.

Figure 2:
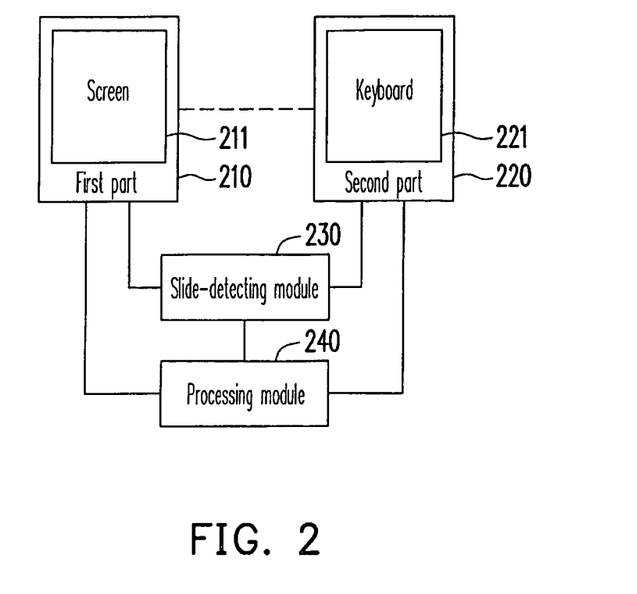
FIG. 2 is a structural block diagram illustrating a handheld electronic device according to an embodiment of the present invention.

FIG. 2 is a structural block diagram illustrating a handheld electronic device according to an embodiment of the present invention. Referring to FIG. 2, the handheld electronic device 200 includes a first part 210, a second part 220, a slide-detecting module 230 and a processing module 240. In the present embodiment, the handheld electronic device 200 may be a cell phone, a personal digital assistant (PDA) phone or a smart phone etc, which is not limited by the present invention.

The first part 210 includes a screen 211 for displaying the user interface, and inputting may be performed through a keyboard 221 on the second part 220. In the present embodiment, the second part 220 is slidingly disposed below the first part 210 along a specific path, wherein the specific path may be a horizontal path or a vertical path. Namely, the second part 220 may be slid out along the horizontal path relative to the first part 210, or may be slid out along the vertical path relative the first part 210. The handheld electronic device 200 further includes a slide-detecting module 230 coupled to the first part 210 and the second part 220. The slide-detecting module 230 is used for detecting a sliding action of the second part 220 sliding out along the specific path relative to the first part 210.

The processing module 240 is coupled to the first part 210, the second part 220 and the slide-detecting module 230, and is used for judging a part type of the second part 220 when the slide-detecting module 230 detects the sliding action of the second part 220. In an embodiment, the slide-detecting module 230 may be a slide switch, and the processing module 240 then judges the part type of the second part 220 according to a sliding direction, i.e. whether it is a horizontal sliding direction or a vertical sliding direction of the second part 220. In another embodiment, the slide-detecting module 230 may be a sensor, and the processing module 240 then judges the part type of the second part 220 according to a movement direction of the handheld electronic device 200 when the second part 220 is slid out.

Moreover, the processing module 240 may further switch and display a corresponding user interface on the screen 211 according to different part types. Wherein, the displayed user interface is corresponding to all application programs relative to the part type.

Figure 3:
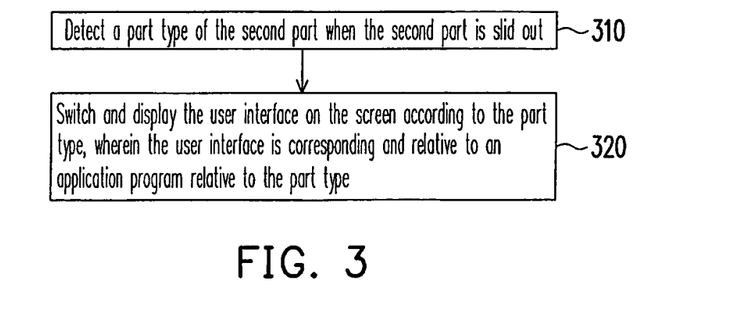
FIG. 3 is a flowchart illustrating a method for switching a user interface according to an embodiment of the present invention.

To further describe a detailed operation flow of the method for switching the user interface within the handheld electronic device 200, another embodiment is provided for describing the present invention in detail. FIG. 3 is a flowchart illustrating a method for switching a user interface according to an embodiment of the present invention. Referring to FIG. 2 and FIG. 3, the slide handheld electronic device 200 is taken as an example in the present embodiment for describing the method for switching different kind of user interfaces on the handheld electronic device 200. First, in step 310, when the second part 220 slidingly disposed below the first part 210 is slid out along the specific path, the slide-detecting module 230 detects the sliding action of the second part 220, and the processing module 240 judges the part type of the second part 220. In the present embodiment, the second part 220 includes the keyboard 221. Wherein, the keyboard 221 may be a QWERTY keyboard, or may be a keyboard composed of letter keys, symbol keys (such as a comma key and a full stop key etc.), function keys (such as an input mode switching key etc.), numeral keys or other different kind of keys. Therefore, in the present embodiment, the part type of the second part 220 is the key type of the keyboard 221.

Next, in step 320, the processing module 240 lists the application program corresponding and relative to the part type on the user interface, and displays the user interface on the screen 211. Furthermore, the processing module 240 displays the corresponding user interface according to the key type of the keyboard. Wherein, if the key type of the keyboard 221 includes the letter keys, the user interface displayed on the screen 211 under control of the processing module 240 then includes a corresponding application program requiring the letter keys during operation thereof; if the key type of the keyboard 221 includes the symbol keys, the displayed user interface then includes a corresponding application program requiring the symbol keys during operation thereof; and if the key type of the keyboard includes the function keys, the user interface displayed on the screen 211 then includes a corresponding application program requiring the function keys during operation thereof. Moreover, if the key type of the keyboard includes the numeral keys, the displayed user interface then includes a corresponding application program requiring the numeral keys during operation thereof. Namely, the application program included in the user interface displayed by the processing module 240 corresponds to each key type of the keyboard 221.

Figure 4:
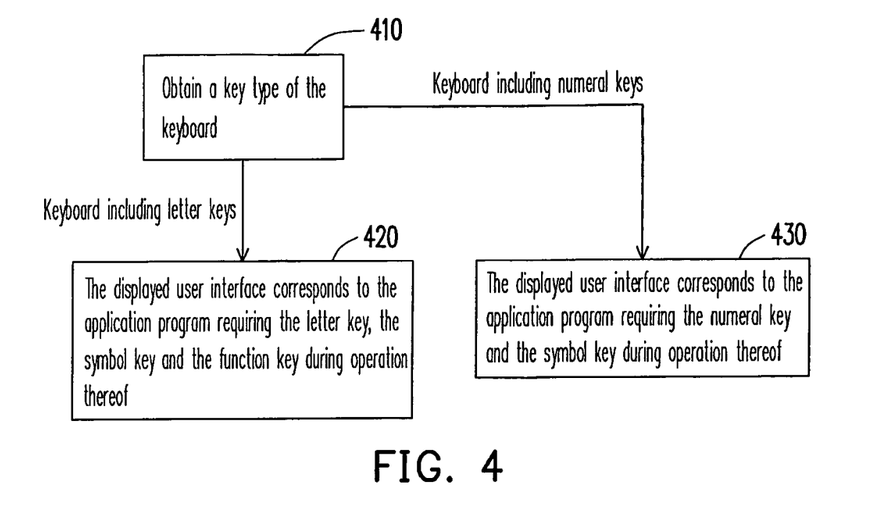
FIG. 4 is a flowchart illustrating a switching process of a user interface according to an embodiment of the present invention.

In an embodiment, in step 410 of FIG. 4, the slide-detecting module 230 first detects a sliding action, and the processing module 240 then obtains the key type of the keyboard 221. If the processing module 240 judges the key types of the keyboard 221 includes the letter keys, the symbol keys and the function keys (in other words, the keyboard 221 is a keyboard including letter keys on the second part 220), in step 420, the processing module 240 then switches and displays the user interface on the screen 211, wherein the application program displayed on the user interface is an application program requiring the letter keys, the symbol keys and the function keys during operation thereof. In this embodiment, the displayed application programs are, for example, an e-mail application program, a message application program, a book-marks application program, a web search application program, an appointment application program, a tasks application program, a note application program, and a contact application program etc. However, in step 430, if the processing module 240 judges the key types of the keyboard 221 includes the numeral keys and the symbol keys (the keyboard 221 is, for example, a keyboard including numeral keys on the second part 220), the processing module 240 then displays the user interface with the application program requiring the numeral keys and the symbol keys during operation thereof on the screen 211.

It should be noted that, in an embodiment, when the processing module 240 switches and displays the user interface on the screen 211, the representative icon of the above application program is also displayed on the user interface. In another embodiment, the processing module 240 may obtain an operation image of one of the application programs (for example, a predetermined application program), and display the operation image on the user interface. The operation image is, for example, integrating with a pattern of the second part 220. More particularly, the operation image comprises a software keyboard, and the software keyboard is combined with the keyboard 221 disposed on the second part 220. As a result, an user can view the software keyboard and the keyboard 221 as a whole so as to operate the handheld electronic device 200 more flexibly.

Figure 5A:
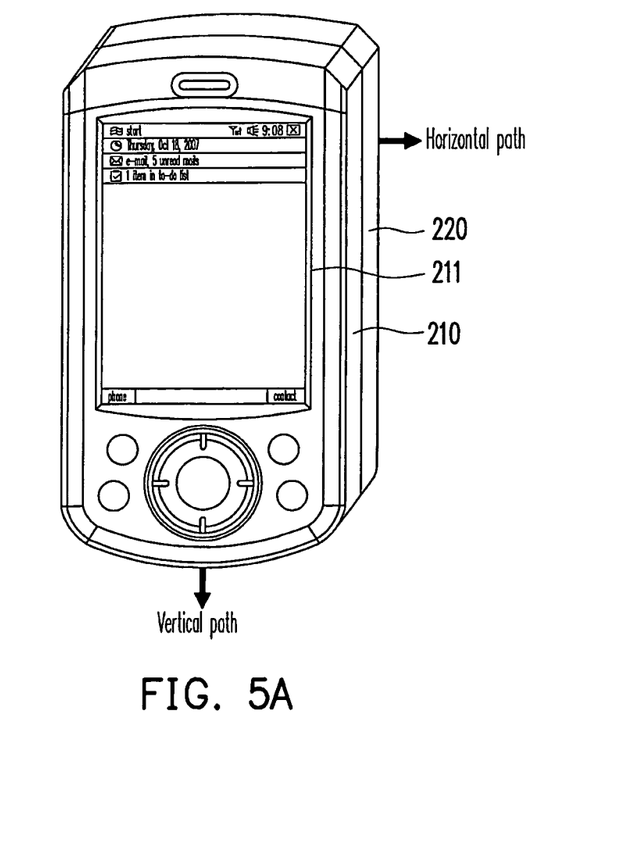
FIGS. 5A, 5B, 5C, 5D and 5E are schematic diagrams respectively illustrating a handheld electronic device according to an embodiment of the present invention.

In the following embodiment, the handheld electronic device 200 is assumed to be installed with a windows operating system, and appearance thereof is shown as FIG. 5A. As shown in FIG. 5A, when the second part 220 is not slid out, a standby image of the operating system or home screen is displayed on the screen 211. For convenience, assuming the second part 220 may be slid out on the right hand side along the horizontal path relative to the first part 210, and the keyboard 221 disposed on the second part 220 includes the letter keys (in the present embodiment, the keyboard 221 is a QWERTY keyboard and may further include the symbol keys and the function keys). When the second part 220 is slid out, the processing module 240 first detects the part type of the second part 220. Next, the processing module 240 obtains at least one application program corresponding and relative to the second part 220 (for example a Microsoft Office application program, an e-mail application program, a message application program, a bookmarks application program, a web search application program, an appointment application program, a tasks application program, a note application program, or a contact application program etc.) requiring the keyboard including the letter keys during operation thereof, and lists the representative icons corresponding to the application programs on the user interface, and displays the user interface on the screen 211 (shown as the screen 211 of FIG. 5B).

Moreover, the user may also select a predetermined application program (for example, Microsoft Word) from the application programs requiring the keyboard including the letter keys, according to an actual requirement. Accordingly, when the processing module 240 judges the slide out second part 220 includes the keyboard including the letter keys, the processing module 240 directly displays the operation image of the predetermined application program on the user interface (shown as the screen 211 of FIG. 5C). Moreover, when the second part 220 is slid out, the processing module 240 may switch a user interface simultaneously displaying the representative icons of the application programs and the operation image of the predetermined application program on the screen 211 (shown as the screen 211 of FIG. 5D).

Figure 5B:
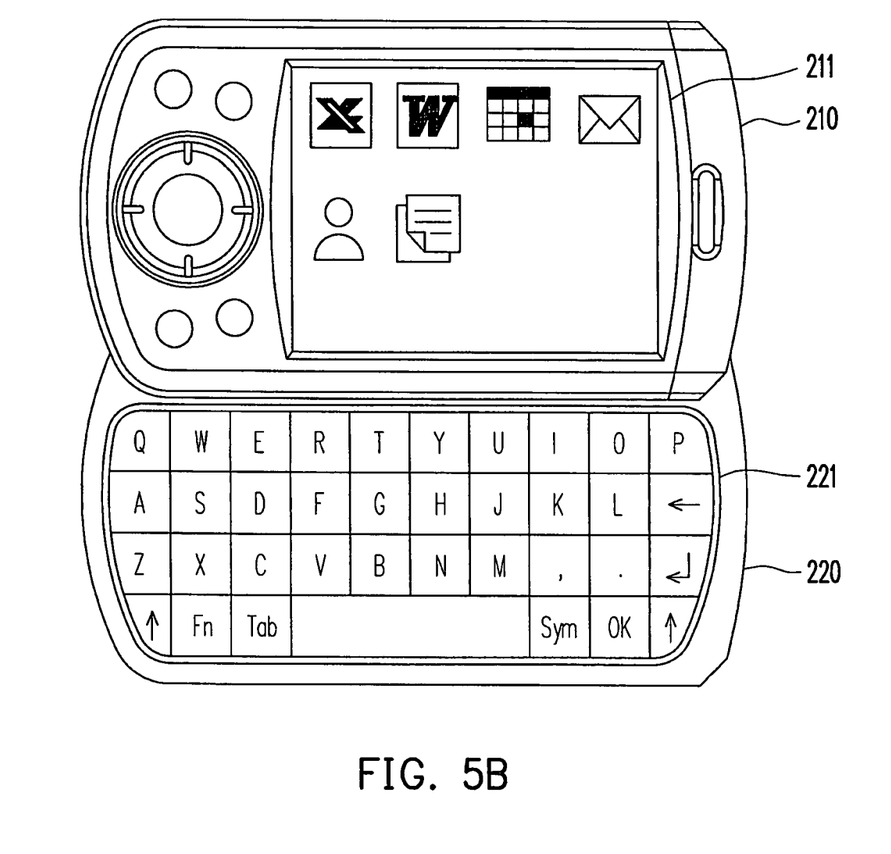
Figure 5C:
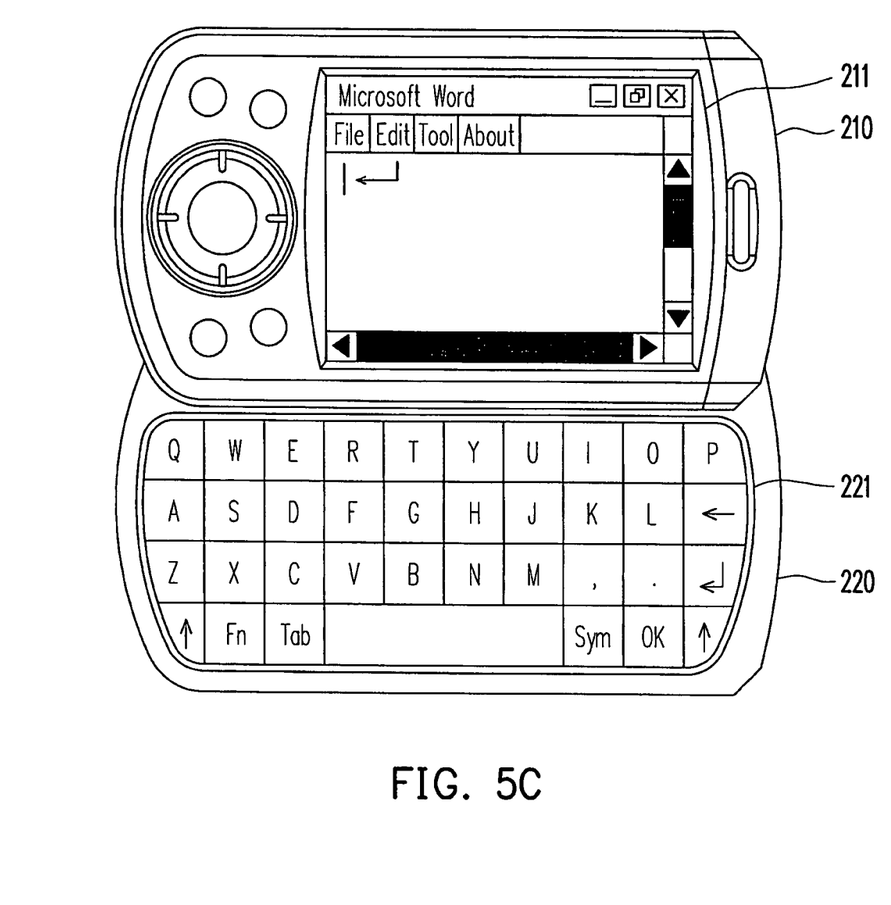
Figure 5D:
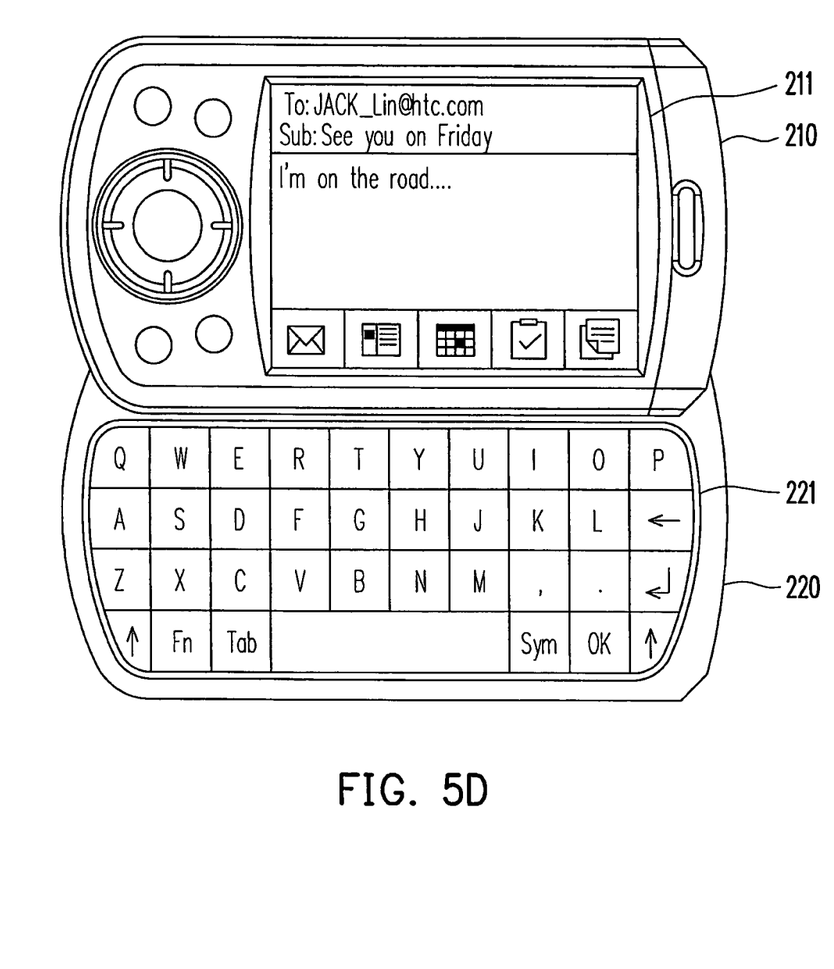

It should be noted that FIGS. 5B to 5D are schematic diagrams of the handheld electronic device 200 with 90 degrees clockwise rotation after the second part 220 is slid out. However, rotation or not is not limited by the present invention. Namely, regardless of whether or not the handheld electronic device 200 is rotated, once the slide-detecting module 230 detects the second part 220 is slid out, the processing module 240 then display the user interface with different application programs according to the part type of the second part 220. Furthermore, when the keyboard including the letter keys is slid out, the user interface displayed on the screen 211 then includes the representative icon of the application program related to the above keyboard, or includes the operation image of the predetermined application program selected from the application programs. Therefore, the desired application program then may be directly selected and inputting and operation thereof may be performed via the keyboard including the letter keys.

Figure 5E:
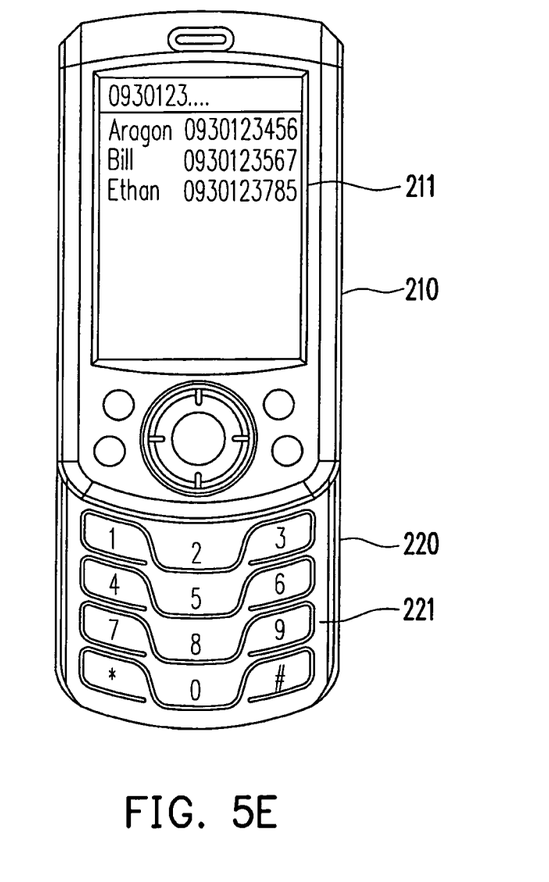

In another embodiment, referring to FIG. 5A and FIG. 5E, assuming the second part 220 of the handheld electronic device 200 may be slid out downward along the vertical path, and the keyboard 221 of the second part 220 includes the numeral keys thereon (for example, the keyboard is composed of the numeral keys and the symbol keys). When the second part 220 is slid out, and the slide-detecting module 230 detects the part type of the second part 220 is the keyboard including the numeral keys, the user interface displayed on the screen 211 under control of the processing module 240 then corresponds to all the application programs (for example, a phone call application program) requiring such kind of keyboard during operation thereof. For example, as shown in FIG. 5E, when the second part 220 with the part type thereof being the keyboard including the numeral keys is slid out downward, the user interface displayed on the screen 211 is then the operation image of making a phone call. Therefore, the user may directly make the phone call via the numeral keys, and the operation efficiency of the handheld electronic device 200 is improved.

In still another embodiment, when the handheld electronic device 200 has a two-way slide function (for example, the keyboard including the letter keys may be slide out along the horizontal path, and the keyboard including the numeral keys may be slide out along the vertical path), the slide-detecting module 230 and the processing module 240 may switch the user interface according to the key type of the keyboard, and may display the application program corresponding to the key type of the keyboard on the user interface. However, since the method for switching the user interface is the same to that of the aforementioned embodiment, the description thereof is then not repeated.

In the aforementioned embodiments, the user interface including the application program corresponding to the key type of the keyboard may be switched and displayed by detecting the key type of the keyboard, such that activation of the application program by repeatedly clicking and selecting a complicated function menu is unnecessary, and a desired application program displayed on the user interface may be directly selected, and accordingly utilization convenience of the application programs is improved.

Figure 6:
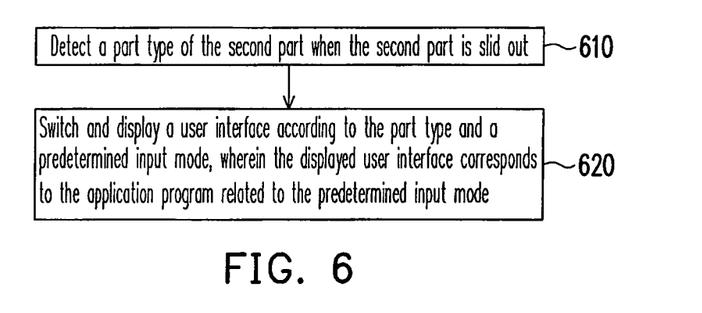
FIG. 6 is a flowchart illustrating a method for switching a user interface according to another embodiment of the present invention.

It should be noted that each kind of keyboard may correspond to a plurality of input modes such as a Chinese input mode, an English input mode, a numeral input mode or a symbol input mode etc. In another embodiment, referring to FIG. 2 and FIG. 6, first in step 610, when the slide-detecting module 230 detects the second part 220 (including the keyboard 221) of the handheld electronic device 200 is slid out, the processing module 240 first detects the part type of the second part 220. Next, in step 620, the processing module 240 may switch and display the user interface simultaneously according to the part type and a predetermined input mode (for example, the English input mode) of the keyboard 221. The user interface displayed on the screen 211 under control of the processing module 240 may include all the application programs corresponding to the predetermined input mode.

In summary, according to the handheld electronic device and the method for switching the user interface provided by the present invention, the user interface may be switched according to the key type of the slide out keyboard or the input mode of the keyboard, and the application program corresponding to the key type of the keyboard or the input mode of the keyboard is displayed on the user interface. Accordingly, when the keyboard is slid out, the desired application program displayed in the user interface then may be directly selected, and inputting may be performed via the slide out keyboard. Such intuitive operation may not only save a lot time on finding a position of the desired application program from a complicated function menu as that does in the conventional method, but may also greatly improve a convenience of activating and operating the application program on the handheld electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for switching a user interface, for a handheld electronic device comprising a first part and a second part, the method for switching a user interface comprising:
   detecting whether the second part comprising a keyboard is slid out of the handheld electronic device along a first specific path or a second specific path, wherein the second part is slidingly disposed below a first part which comprises a screen, and the first specific path and the second specific path are different paths;
   judging a part type of the second part from a plurality of part types based on the first specific path or the second specific path, and when the second part is slid out and wherein when the second part is slid out according the first specific path, the second part corresponds to a letter keys part type and when the second part is slid out according to the second specific path, the second part corresponds to a numeral keys part type;
   switching and displaying the user interface on the screen according to the detected part type of the second part, wherein the user interface comprises at least one application program which requires the detected second part type; and
   wherein the letter keys second part type comprises a letter key, a symbol key, and a function key, and the numeral keys second part type comprises a symbol key and a numeral key, and
   wherein when the letter keys key type of the second part is slid out, the displayed user interface comprises only the corresponding application program requiring the letter key, the symbol key, and the function key during operation thereof.

2. The method for switching a user interface as claimed in claim 1, wherein the first specific path is a horizontal path and a second path is a vertical path.

3. The method for switching a user interface as claimed in claim 1, wherein the second part comprises a QWERTY keyboard.

4. The method for switching a user interface as claimed in claim 1, wherein the step of switching and displaying the user interface on the screen according to the part type comprises switching and displaying the corresponding user interface requiring the key type of the keyboard.

5. The method for switching a user interface as claimed in claim 1 further comprising switching and displaying the user interface on the screen according to a predetermined input mode of the keyboard, wherein the user interface comprises the application program corresponding to the predetermined input mode, wherein the predetermined input mode comprises one of a Chinese input mode, a numeral input mode, a symbol input mode and an English input mode.

6. The method for switching a user interface as claimed in claim 1, wherein the step of switching and displaying the user interface on the screen comprises displaying a representative icon of each of the application programs on the user interface.

7. The method for switching a user interface as claimed in claim 1, wherein the step of switching and displaying the user interface on the screen comprises displaying an operation image of one of the application programs on the user interface.

8. The method for switching a user interface as claimed in claim 7, wherein the operation image integrates with a pattern of the second part.

9. A handheld electronic device, comprising:
a first part, comprising a screen;
a second part, slidingly disposed below the first part and can slide in and out of the handheld electronic device according to a first specific path and a second specific path, wherein the second part comprises a keyboard, and the first specific path and the second specific path are two different paths;
a slide-detecting module, coupled to the first part and the second part, for detecting a sliding action of the second part sliding out along the specific path out of the handheld electronic device relative to the first part;
a processing module, coupled to the first part, the second part and the slide-detecting module, for judging a part type of the second part from a plurality of second part types based on the first specific path or the second specific path when the slide-detecting module detects the sliding action of the second part, and wherein when the second part is slid out according the first specific path, the second part corresponds to a letter keys part type and when the second part is slid out according to the second specific path, the second part corresponds to a numeral keys part type, and switching and displaying a user interface on the screen according to the part type, wherein the user interface comprises at least one application program which requires corresponding and relative to the part type; and wherein the letter keys second part type of the comprises a letter key, a symbol key, and a function key, and the numeral keys second part type comprises a symbol key and a numeral key, and wherein when the letter keys key type of the second part is slid out, the displayed user interface comprises only the corresponding application program requiring the letter key, the symbol key, and the function key or during operation thereof.

10. The handheld electronic device as claimed in claim 9, wherein the first specific path is a horizontal path and a second path is a vertical path.

11. The handheld electronic device as claimed in claim 9, wherein the second part comprises QWERTY keyboard.

12. The handheld electronic device as claimed in claim 9, wherein the processing module switches and displays the corresponding user interface requiring the key type of the keyboard.

13. The handheld electronic device as claimed in claim 9, wherein the processing module switches and displays the user interface on the screen according to a predetermined input mode of the keyboard, wherein the user interface comprises the application program corresponding to the predetermined input mode, wherein the predetermined input mode comprises one of a Chinese input mode, a numeral input mode, a symbol input mode and an English input mode.

14. The handheld electronic device as claimed in claim 9, wherein the processing module displays a representative icon of each of the application programs on the user interface.

15. The handheld electronic device as claimed in claim 9, wherein the processing module displays an operation image of one of the application programs on the user interface.

16. The handheld electronic device as claimed in claim 15, wherein the operation image integrates with a pattern of the second part.

17. The handheld electronic device as claimed in claim 9, wherein the slide-detecting module comprises a slide switch or a sensor.

* * * * *